(12) United States Patent
Badger et al.

(10) Patent No.: US 11,092,049 B2
(45) Date of Patent: Aug. 17, 2021

(54) METHODS AND SYSTEM FOR OPERATING AN ENGINE

(71) Applicant: Ford Global Technologies, LLC, Dearborn, MI (US)

(72) Inventors: Justin Badger, Plymouth, MI (US); Kenneth Frederick, Dearborn, MI (US); Robert Hurley, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 16/287,083

(22) Filed: Feb. 27, 2019

(65) Prior Publication Data
US 2020/0271028 A1 Aug. 27, 2020

(51) Int. Cl.
| | | |
|---|---|---|
| *F01N 3/023* | (2006.01) | |
| *F02D 13/02* | (2006.01) | |
| *F02D 41/02* | (2006.01) | |
| *F02D 41/14* | (2006.01) | |
| *F02D 41/00* | (2006.01) | |

(52) U.S. Cl.
CPC ......... *F01N 3/023* (2013.01); *F02D 13/0207* (2013.01); *F02D 13/0261* (2013.01); *F02D 41/0002* (2013.01); *F02D 41/029* (2013.01); *F02D 41/0245* (2013.01); *F02D 41/1446* (2013.01); *F02D 41/1448* (2013.01); *F01N 2430/085* (2013.01); *F01N 2430/10* (2013.01); *F02D 2041/001* (2013.01)

(58) Field of Classification Search
CPC combination set(s) only.
See application file for complete search history.

(56) References Cited

U.S. PATENT DOCUMENTS

| | | | |
|---|---|---|---|
| 8,136,505 B2 * | 3/2012 | Ruhland | F01N 3/101 123/406.19 |
| 10,273,858 B2 * | 4/2019 | Hall | F01N 9/002 |
| 2003/0140623 A1 * | 7/2003 | Ootake | F01N 9/002 60/297 |
| 2004/0128987 A1 * | 7/2004 | Kuboshima | F02D 41/029 60/295 |
| 2011/0162620 A1 | 7/2011 | Bidner et al. | |
| 2015/0020507 A1 | 1/2015 | Sun, Jr. et al. | |
| 2017/0158194 A1 * | 6/2017 | Leisenring | F01N 3/025 |
| 2017/0234196 A1 * | 8/2017 | Ulrey | F01N 3/0238 60/274 |
| 2018/0149103 A1 * | 5/2018 | Nishigaki | F02D 29/02 |
| 2019/0078524 A1 * | 3/2019 | Suchta | F02D 41/1446 |

OTHER PUBLICATIONS

Badger, J. et al., "Methods and System for Automatically Stopping an Engine," U.S. Appl. No. 16/226,408, filed Dec. 19, 2018, 38 pages.

* cited by examiner

*Primary Examiner* — Binh Q Tran
(74) *Attorney, Agent, or Firm* — Geoffrey Brumbaugh; McCoy Russell LLP

(57) ABSTRACT

Systems and methods for operating a spark ignition engine that includes a particulate filter in the engine's exhaust system are described. In one example, the spark ignition engine is prevented from exceeding a threshold engine load when the engine is supplying power to an electric machine so that engine emissions may be reduced.

20 Claims, 7 Drawing Sheets

METHODS AND SYSTEM FOR OPERATING AN ENGINE

FIELD

The present description relates to methods and a system for operating an engine that includes a particulate filter.

BACKGROUND AND SUMMARY

An engine may be equipped with an exhaust system that includes a particulate filter. The particulate filter may trap carbonaceous soot during times when the engine may generate some soot. For example, at cold engine temperatures, soot may be ejected from the engine to the engine's exhaust system and the particulate filter may prevent the soot from leaving the engine's exhaust system. In addition, the amount of soot that may be produced by the engine may increase when the engine is operated at higher engine loads. Soot may accumulate in the particulate filter until a time when a pressure drop across the particulate filter exceeds a threshold level. Once the pressure drop across the particulate filter exceeds the threshold level, the particulate filter may be regenerated via oxidizing soot within the particulate filter. However, the particulate filter may be less efficient than may be desired. Consequently, it may be possible for small amounts soot to pass through the particulate filter. Therefore, it may be desirable to provide a way of reducing soot emissions so that even less soot may pass through the particulate filter.

The inventors herein have recognized the above-mentioned issues and have developed an engine operating method, comprising: adjusting a not to exceed threshold engine load via a controller in response to an amount of soot stored in a particulate filter of a spark ignited engine; and operating an engine without exceeding the not to exceed threshold engine load via the controller.

By adjusting a maximum engine load threshold as a function of an amount of soot stored in a particulate filter, it may be possible to provide the technical result of reducing soot flow through a particulate filter during conditions when an engine generates higher amounts of soot. Specifically, if an amount of soot stored in a particulate filter is low, then the maximum engine load threshold may be lowered so that the engine may generate less soot when soot trapping efficiency of the particulate filter may be lower. Conversely, if the amount of soot stored in the particulate filter is high, then the maximum engine load threshold may be increased so that engine output power may be increased to meet demand requirements. The inventors herein have recognized that the efficiency of the particulate filter to trap soot increases as the amount of soot stored within the particulate filter increases. Therefore, a maximum engine load may be increased or decreased according to the amount of soot stored in the particulate filter so that less soot may pass through the particulate filter, at least during some conditions.

The present description may provide several advantages. In particular, the approach may reduce engine soot emissions. Further, the approach may be applied without a noticeable reduction in powertrain propulsive power loss. In addition, the approach may increase opportunities for the engine to generate less soot, yet still provide maximum powertrain power when it is requested.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
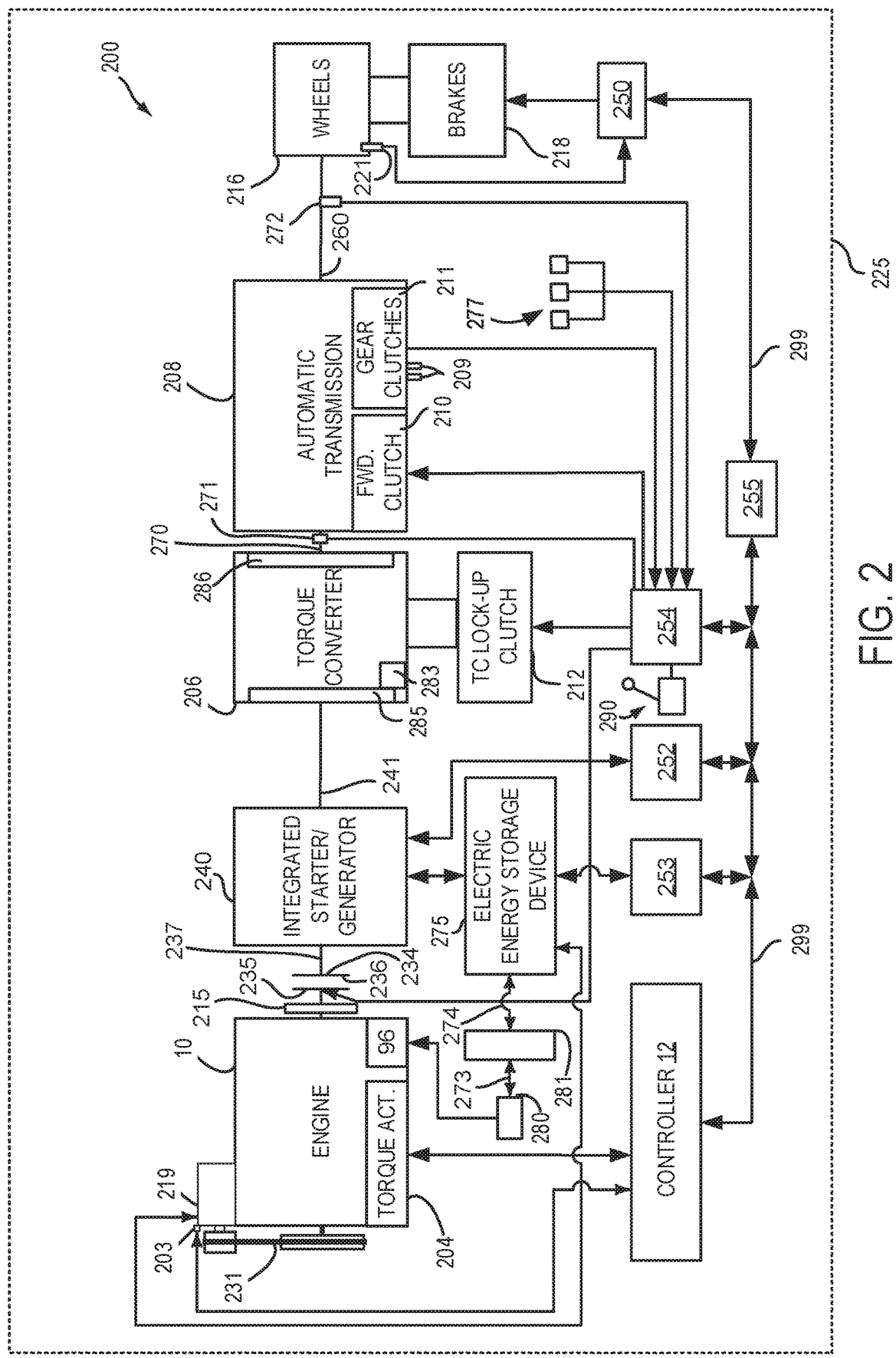
FIG. 2 is a schematic diagram of a first hybrid vehicle driveline.
Figure 3:
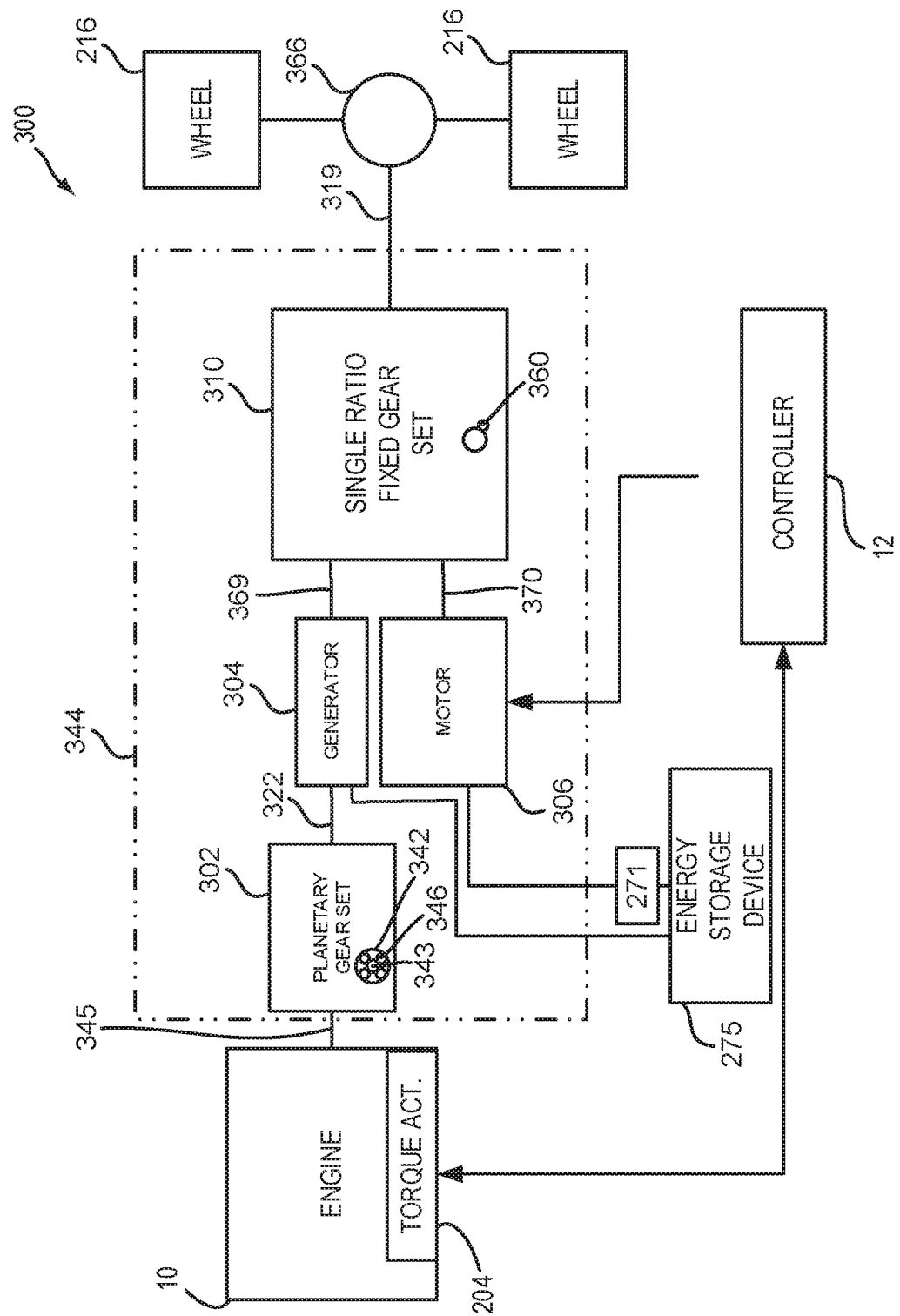
FIG. 3 is a schematic diagram of a second hybrid vehicle driveline.
Figure 5:
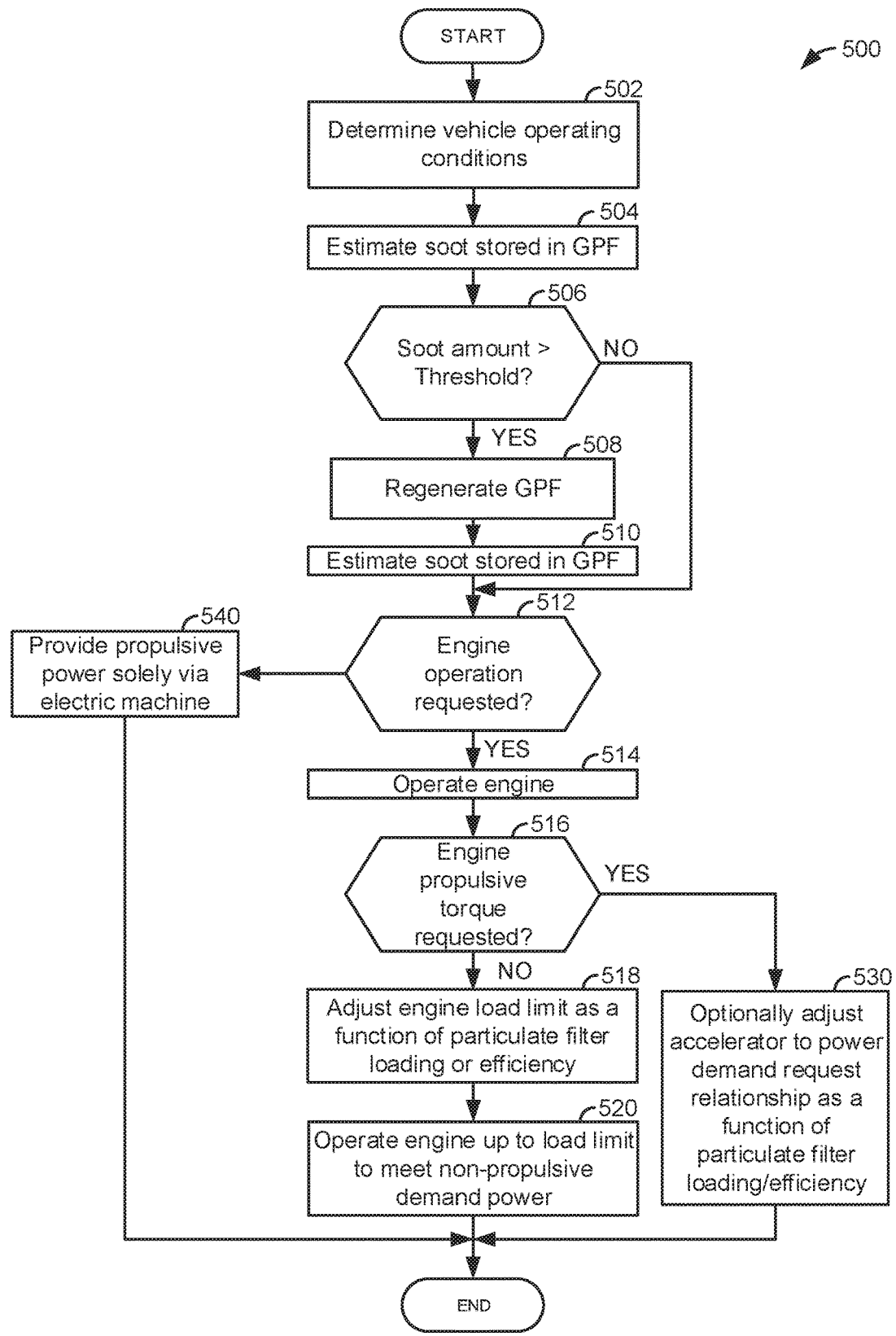
FIG. 5 shows an example method for operating an engine.
Figure 6:
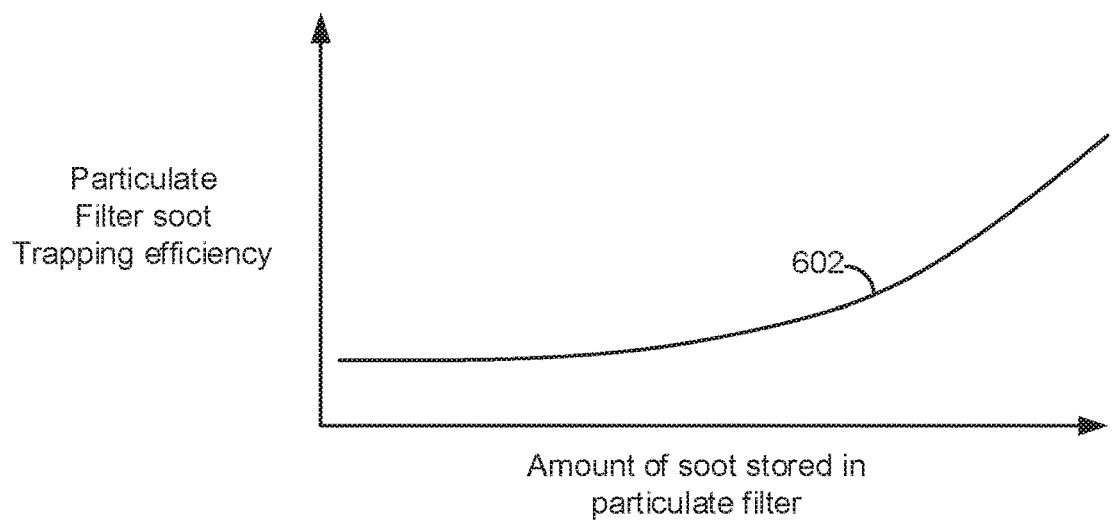
FIG. 6 shows a plot of particulate filter soot trapping efficiency versus an amount of soot stored in the particulate filter.
Figure 7:
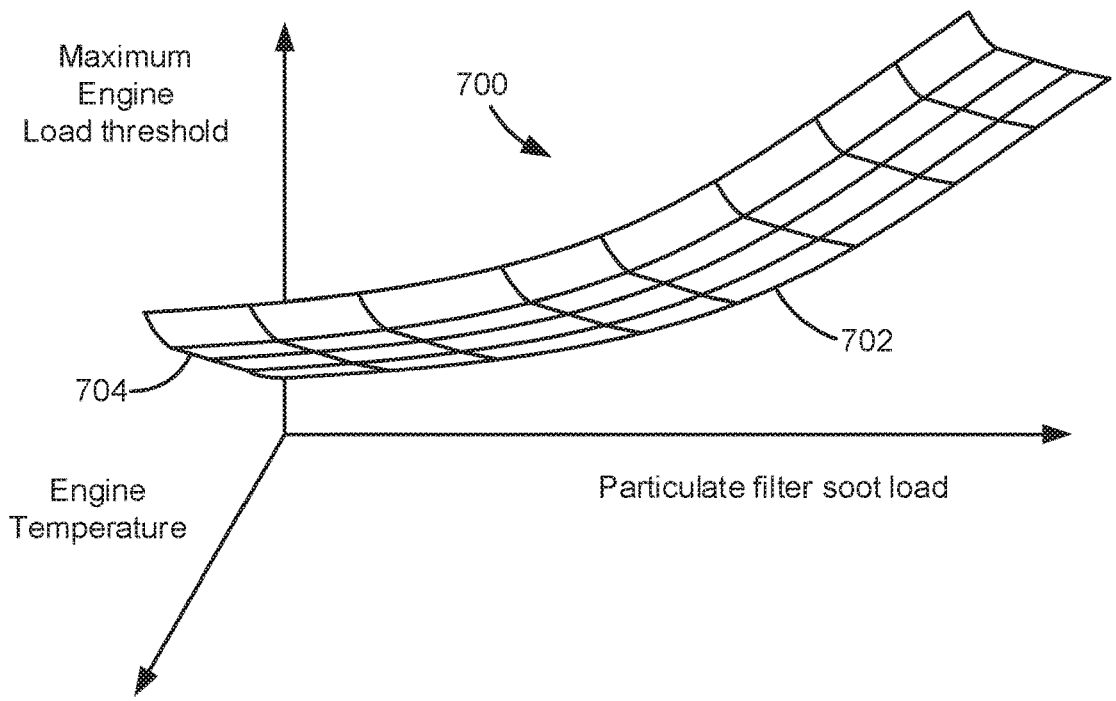
FIG. 7 shows a plot of a maximum engine load versus particulate filter soot load and engine temperature.
Figure 8:
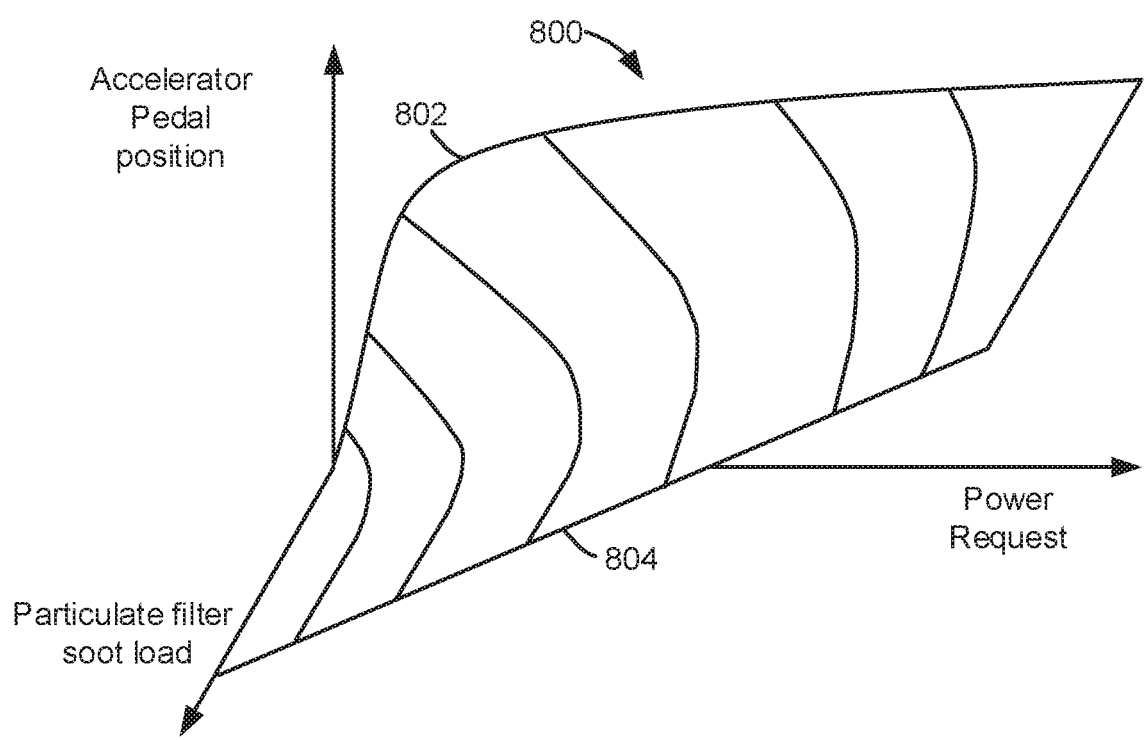
FIG. 8 shows a plot of accelerator pedal position versus engine power request and particulate filter soot load.

The present description is related to operating an engine that includes a particulate filter. The engine may be of the type shown in FIG. 1. The engine may be included in a driveline of a hybrid vehicle as shown in FIGS. 2 and 3. The engine may be operated according to the sequence shown in FIG. 4. The sequence of FIG. 4 may be provided via the system of FIGS. 1-3 and the method of FIG. 5. A flowchart of a method for operating an engine with a particulate filter is shown in FIG. 5. A plot of a relationship between an amount of soot trapped in a particulate filter and soot trapping efficiency of a particulate filter is shown in FIG. 6. FIGS. 7 and 8 show plots of how engine load may be controlled.

Figure 1:
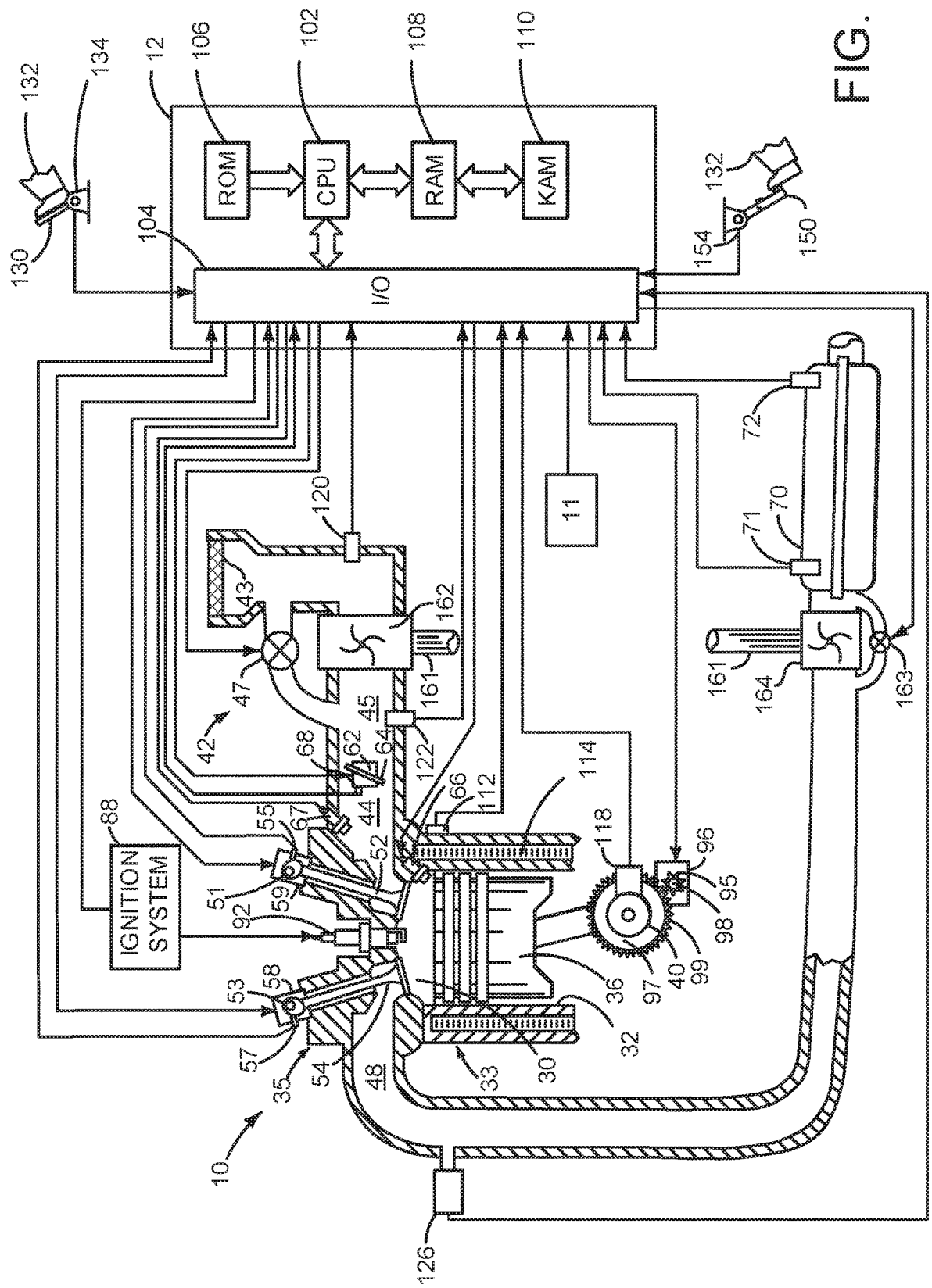
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3 and employs the actuators shown in FIGS. 1-3 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of particulate filter 70. Alternatively, a two-state exhaust gas oxygen sensor may be substituted for UEGO sensor 126.

Particulate filter 70 can include multiple bricks and a three-way catalyst coating, in one example. In another example, multiple emission control devices, each with multiple bricks, can be used. A differential pressure across particulate filter 70 may be determined from upstream pressure sensor 71 and downstream pressure sensor 72. The differential pressure sensor may reference a table of empirically determined amounts of soot that may be stored in particulate filter 70. The table output amounts of soot responsive to the pressure drop across the particulate filter 70.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

BISG 219 is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

Disconnect clutch 236 may be fully closed when engine 10 is supplying power to vehicle wheels 216. Disconnect clutch 236 may be fully open when engine 10 is stopped (e.g., not combusting fuel) or when engine 10 is supplying power to BISG 219 and BISG 219 is generating electrical charge to charge electric energy storage device 275 or supplying electrical charge to ISG 240.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216.

Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290

(e.g., a human/machine interface device). Gear shift lever may include positions for gears 1-N (where N is the an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Referring now to FIG. 3, an example of an alternative driveline 300 is shown. Driveline 300 includes engine 10 and torque actuator 204 as described in FIGS. 1 and 2. Engine 10 delivers power to transmission 344 via torque input shaft 345. In the depicted example, transmission 344 is a power-split transmission (or transaxle) that includes a planetary gear set 302 that include one or more rotating gear elements. Transmission 344 further includes an electric generator 304 and an electric motor 306. The electric generator 304 and the electric motor 306 may also be referred to as electric machines as each may operate as either a motor or a generator. Torque is output from transmission 344 for propelling vehicle tractions wheels 216 via a power transfer gearing 310, a torque output shaft 319, and differential-and-axle assembly 366.

Generator 304 is driveably connected to electric motor 306 such that each of electric generator 304 and electric motor 306 may be operated using electric energy from an electric energy storage device 275. In some examples, an energy conversion device, such as an inverter 271, may be coupled between the battery and the motor to convert the DC output of the battery into an AC output for use by motor 306. Due to the mechanical properties of the planetary gear set 302, generator 304 may be driven by a power output element (on an output side) of the planetary gear set 302 via mechanical connection 322.

Electric motor 306 may be operated in a regenerative mode, that is, as a generator, to absorb kinetic energy from the vehicle and/or the engine and convert the absorbed kinetic energy to an energy form suitable for storage in electric energy storage device 275. In addition, electric motor 306 may be operated as a motor or generator, as required, to augment or absorb torque provided by the engine, such as during a transition of engine 10 between different combustion modes.

Planetary gear set 302 comprises a ring gear 342, a sun gear 343, and a planetary carrier assembly 346. The ring gear and sun gear may be coupled to each other via the carrier 346. A first input side of planetary gear set 302 is coupled to engine 10 while a second input side of the planetary gear set 302 is coupled to engine 10 while a second input side of the planetary gear set 302 is coupled to the generator 304. An output side of the planetary gear set 302 is coupled to vehicle traction wheels 216 via power transfer gearing 310 including one or more meshing gear elements 360. In one example, the meshing gear elements 360 may be step ratio gears wherein carrier assembly 346 may distribute torque to the step ratio gears. Electric motor 306 drives gear element 370 and generator 304 is coupled to gear element 369. In this way, the planetary carrier 346 (and consequently the engine and generator) may be coupled to the vehicle's wheels and the motor 306 via one or more gear elements. Hybrid propulsion system 300 may be operated in various modes including a full hybrid mode, wherein the vehicle is drive by only engine 10 and generator 304 cooperatively, or only the electric motor 306, or a combination of the same. Alternatively, assist or mild hybrid examples may also be employed, wherein the engine 10 is the primary source of power and the electric motor 306 selectively adds torque during specific conditions, such as during an accelerator tip-in event (e.g., application of the accelerator pedal).

The vehicle may be driven in a first engine-on mode, which may be referred to as an "engine" mode, wherein engine 10 is operated in conjunction with the electric generator 304 (which provides reaction torque to the planetary gear-set and allows a net planetary output torque for propulsion of the vehicle) and used as the primary source of power and torque for powering wheels 216 (the generator may also be providing torque to wheels if in motoring mode). During the "engine" mode, fuel may be supplied to engine 10 from a fuel tank via fuel injector 66 so that the engine can spin fueled to provide the torque for propelling the vehicle. Specifically, engine power is delivered to the ring gear 342 of the planetary gear set 302, thereby delivering power to wheels 216. Optionally, the engine may be operated to output more torque than is needed for propulsion, in which case the additional power may be absorbed by generator 304 (in a generating mode) to charge electric energy storage device 275 or supply electrical power for other vehicle electrical loads.

In another example, the hybrid propulsion system may be driven in a second engine-on mode, which may be referred to as an "assist" mode. During assist mode, engine 10 is operated and used as the primary source of torque for powering wheels 216 and electric motor 306 is used as an additional torque source to act in cooperation with, and supplement the torque provided by engine 10. During the "assist" mode, as in the engine-only mode, fuel is supplied to engine 10 so as to spin the engine fueled and provide torque to the vehicle wheels.

In still another example, the hybrid propulsion system 300 may be drive in an engine-off mode, which may be referred to as an electric-only mode, wherein battery powered electric motor 306 is operated and used as the only source of power for driving wheels 216. As such, during the engine-off mode, no fuel may be injected to engine 10 irrespective of whether the engine is spinning or not. The "engine-off" mode may be employed, for example, during braking, low speeds, while the vehicle is stopped at traffic signals, etc. Specifically, motor power is delivered to gear element 370, which in turn drives the gear elements 360, thereby driving wheels 216.

During the engine-off mode, based on vehicle speed and driver demand torque, the vehicle may be operated in a first electric-only mode, wherein the vehicle is propelled by the electric energy storage device 275 via the electric motor 306 with the engine not spinning and not fueled, or in a second electric-only mode wherein the vehicle is propelled by the electric energy storage device 275 via electric motor 306 with the engine spinning unfueled. During the second electric-only mode, the generator 304 applies torque to planetary gear set 302 through sun gear 343. The planet carrier 346 provides reaction torque to this generator torque, and consequently directs torque to the engine 10 to spin the engine 10. In this example, the reaction torque provided by carrier 346 is supplied to motor 306 (or alternatively vehicle momentum during deceleration events), and consequently reduces torque from the motor to the wheels.

Thus, the system of FIGS. 1-3 provides for a system, comprising: a spark ignition engine; a particulate filter in an exhaust system of the spark ignition engine; and a controller including executable instructions stored in non-transitory memory to maintain engine load less than a threshold engine load in response to an amount of soot stored in a particulate filter and a driver demand power. The system includes additional instructions to increase engine load above the threshold engine load in response to the driver demand power increasing. The system of further comprises an electric machine and additional instructions to supply power from the spark ignition engine to the electric machine when maintaining engine load less than the threshold engine load. The system further comprises additional instructions to adjust the threshold engine load in response to the amount of soot stored in the particulate filter. The system includes where the driver demand power is a function of accelerator pedal position. The system further comprises additional instructions to estimate the amount of soot stored in the particulate filter.

Figure 4:
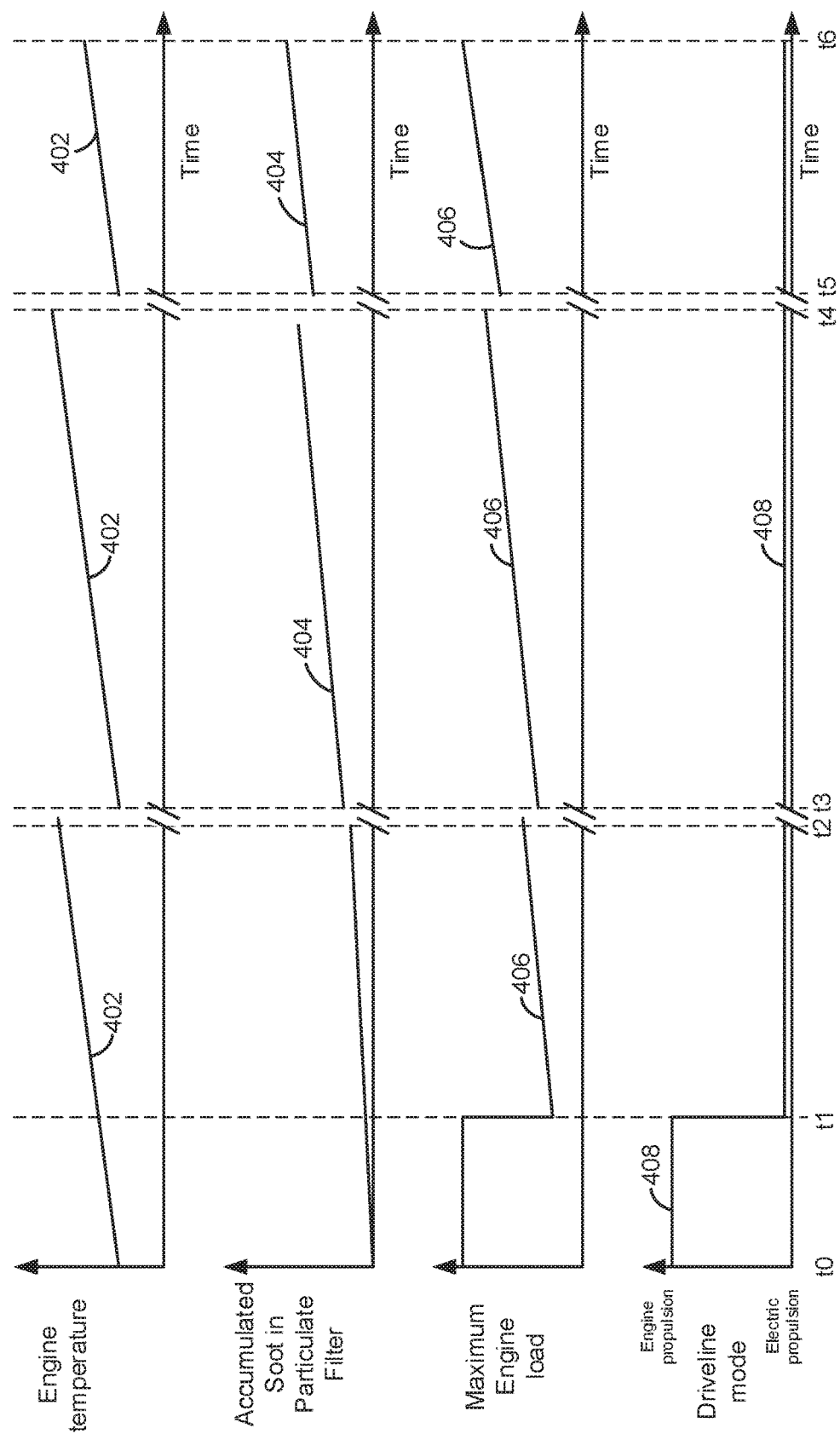
FIG. 4 shows a plot of an example engine operating sequence according to the method of FIG. 5.

Referring now to FIG. 4, example plots of an engine operating sequence are shown. The operating sequence may be performed via the system of FIGS. 1-3 in cooperation with the method of FIG. 5. Vertical lines at times t0-t6 represent times of interest during the sequence. The plots in FIG. 4 are time aligned and occur at the same time. The // marks along the horizontal axis of each plot represent a break in time and the break in time may be long or short in duration.

The first plot from the top of FIG. 4 is a plot of engine temperature versus time. The vertical axis represents engine temperature and engine temperature increases in the direction of the vertical axis arrow. The horizontal axis represents time and time increases from the left side of the figure to the right side of the figure. Solid line 402 represents engine temperature.

The second plot from the top of FIG. 4 is a plot of an amount of soot that is accumulated inside of a particulate filter versus time. The vertical axis represents an amount of soot that is accumulated inside of a particulate filter and the amount of soot that is accumulated inside of a particulate filter increases in the direction of the vertical axis arrow. The horizontal axis represents time and time increases from the left side of the figure to the right side of the figure. Solid line 404 represents an amount of soot that is accumulated inside of a particulate filter.

The third plot from the top of FIG. 4 is a plot of a maximum engine load or an engine load that is not to be exceeded versus time. The vertical axis represents the maximum engine load and maximum engine load increases in the direction of the vertical axis arrow. The horizontal axis represents time and time increases from the left side of the figure to the right side of the figure. Solid line 406 represents the maximum engine load. The engine load may be defined as the present air mass in a cylinder divided by the maximum theoretical air mass that may be in the cylinder at the present ambient temperature and pressure without boosting the engine.

The fourth plot from the top of FIG. 4 is a plot of driveline operating mode versus time. The driveline is operating in an engine propulsion mode (e.g., delivering engine torque to the vehicle wheels) when trace 408 is at a higher level near the vertical axis arrow. The driveline is operating in an electric propulsion only mode (e.g., the electric machine is propelling the vehicle without the engine providing torque to the vehicle wheels) when trace 408 is at a lower level near the horizontal axis. Solid line 408 represents the driveline operating mode.

At time t0, the engine temperature is a lower middle level temperature and the amount of soot that is stored in the particulate filter is low. The driveline is operating in an engine propulsion mode where the engine supplied mechanical torque to the vehicle's wheels. During these conditions, the maximum engine load is adjusted to a high level so that all available engine torque may be provided to vehicle wheels. This allows the driveline to meet a driver demand power or torque request.

At time t1, driveline exits the engine propulsion mode and enters an electric machine propulsion mode. The engine continues to operate and supply torque to the generator (e.g., 304 and it is not shown) so that the electric energy storage device may charge, but engine torque is not provided to vehicle wheels. Further, the electric machine (e.g., 306) may propel the vehicle via electrical charge that is produced by the engine rotating the generator. The amount of soot trapped in the particulate filter has increased by a small amount since time t0. The maximum engine load is reduced to a lower level in response to the vehicle entering the electric machine propulsion mode and the amount of soot being trapped in the particulate filter being low.

Between time t1 and time t2, the engine temperature increases while the engine rotates the generator and supplies electrical charge to the electric energy storage device and motor (not shown). The amount of soot stored in the particulate filter also continues to increase, thereby increasing the soot trapping efficiency of the particulate filter. The maximum engine load is increased as the engine temperature increases and as the amount of soot stored in the particulate filter increases since the engine may produce less soot when operating at higher temperature and since efficiency of the particulate filter may increase with an increased amount of soot stored in the particulate filter. Consequently, less soot may exit the particulate filter. The driveline remains in the electric propulsion mode.

At time t2, a break in the time occurs. The break in time may be long or short in duration. The engine temperature has reached a higher level and the amount of soot stored in the particulate filter has increased. The maximum engine load has increased as the engine temperature and the amount of soot stored in the particulate filter increase. This allows the engine to generate higher torque so that the generator (not shown) may increase production of electric charge. The driveline remains in electric propulsion mode.

At time t3, the break in time ends and the driveline remains in the electric machine propulsion mode. The engine continues to operate and supply torque to the generator (e.g., 304 and it is not shown) so that the electric energy storage device may charge, but engine torque is not mechanically provided to vehicle wheels. The electric machine (e.g., 306) may propel the vehicle via electrical charge that is produced by the engine rotating the generator. The amount of soot trapped in the particulate filter has increased by a small amount since time t2. The engine temperature is low and the maximum engine load is reduced to a lower level in response to the low engine temperature and the small amount of soot that is stored in the particulate filter.

Between time t3 and time t4, the engine temperature increases while the engine rotates the generator and the generator supplies electrical charge to the electric energy storage device and motor (not shown). The amount of soot stored in the particulate filter also continues to increase so that the soot trapping efficiency of the particulate filter increases. The maximum engine load is increased as the engine temperature increases and as the amount of soot stored in the particulate filter increases since the engine may produce less soot when operating at higher temperature and since efficiency of the particulate filter may increase with an increased amount of soot stored in the particulate filter. The driveline remains in the electric propulsion mode.

At time t4, a second break in the time occurs. The second break in time may be long or short in duration. The engine temperature has reached a higher level and the amount of soot stored in the particulate filter has increased. The maximum engine load has increased as the engine temperature and the amount of soot stored in the particulate filter increase. The maximum engine load at time t4 is greater than the maximum engine load at time t2 because the soot trapping efficiency has increased as the amount of soot stored in the particulate filter increases. The driveline remains in electric propulsion mode.

At time t5, the break in time ends and the driveline remains in the electric machine propulsion mode. The engine continues to operate and supply torque to the generator (e.g., 304 and it is not shown) so that the electric energy storage device may charge, but engine torque is not mechanically provided to vehicle wheels. The electric machine (e.g., 306) may propel the vehicle via electrical charge that is produced by the engine rotating the generator. The amount of soot trapped in the particulate filter has increased by a small amount since time t5. The engine temperature is low and the maximum engine load is near a medium level since trapping efficiency of the particulate filter has increased. The maximum engine load at time t5 is greater than the maximum engine load at times t1 and t3.

Between time t5 and time t6, the engine temperature increases while the engine rotates the generator and the generator supplies electrical charge to the electric energy storage device and motor (not shown). The maximum engine load increases over time to a higher level than the maximum engine load at time t4 since the amount of soot stored in the particulate filter continues to increase. The maximum engine load is also increased as the engine temperature increases. The driveline remains in the electric propulsion mode.

At time t6, the sequence ends and the maximum engine load has been increased to a level that is equivalent to the maximum engine load when the driveline operated in engine propulsion mode. This allows the engine to produce a large amount of torque that is available to be converted into electrical charge. The engine temperature has reached a higher level and the amount of soot stored in the particulate filter has increased. The driveline remains in electric propulsion mode.

In this way, the maximum engine load may be adjusted responsive to engine temperature and an amount of soot stored in a particulate filter or a particulate filter efficiency. The maximum engine torque may not adjusted in an engine propulsion mode so that all engine power may be supplied to the vehicle's wheels, if desired. However, in other examples, maximum engine torque may be adjusted in the engine propulsion mode so that less than all available engine power may be supplied to the vehicle's wheels, if desired.

Referring now to FIG. 5, a flow chart of a method for operating an engine with a particulate filter is shown. The method of FIG. 5 may be incorporated into and may cooperate with the system of FIGS. 1-3. Further, at least portions of the method of FIG. 5 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include but are not limited to engine speed, pressure across a particulate filter, hours of engine operation, distance driven by vehicle, engine temperature, engine speed, engine load, and driver demand torque or power. Method 500 proceeds to 504.

At 504, method 500 estimates an amount of soot that is stored in a particulate filter. In one example, method 500 determines a pressure drop across the particulate filter and references or indexes a table or function of empirically determined soot amounts. The table outputs an amount of soot that is stored in the particulate filter and method 500 proceeds to 506.

At 506, method 500 judges if the amount of soot stored in the particulate filter is greater than a threshold amount. The threshold amount may vary with the volume of the particulate filter. If method 500 judges that the amount of soot stored in the particulate filter is greater than the threshold amount, the answer is yes and method 500 proceeds to 508. Otherwise, the answer is no and method 500 proceeds to 512.

At 508, actively method regenerates the gasoline engine particulate filter. In one example, the particulate filter is heated via retarding engine spark timing and increasing exhaust flow through the particulate filter. By increasing the particulate filter temperature, soot stored in the particulate filter may be oxidized so that the amount of soot that is stored in the particulate filter may be reduced. Further, the automatic engine stopping temperature may be increased after regenerating the particulate filter so as to maintain tailpipe emissions levels. In addition, the active regeneration may be stopped when the soot load of the particulate filter is above a first threshold and below a second threshold soot load so that a desired level of particulate filter soot trapping efficiency may be maintained and so that the engine load limit threshold may be above a threshold level that allows a higher level of engine output. For example, the soot load of the particulate filter may be maintained above the first threshold so that engine load is not limited after the particulate filter regeneration.

The particulate filter may also be passively regenerated when the engine is operated at higher speeds and loads to meet driver demand. Thus, the particulate filter may be regenerated when particulate filter regeneration is not specifically requested. This may cause the particulate filter soot load to fall below the previously mentioned first soot load threshold. Immediately following such passive particulate filter regenerations, the engine load limit threshold may be reduced so lower tailpipe soot emissions. Method 500 proceeds to 510.

Thus, the present method may adjust a not to exceed threshold engine load via a controller in response to an amount of soot stored in a particulate filter of a spark ignited engine in responsive to a passive particulate filter regeneration that is not requested and that is not based on particulate filter load, but rather occurs as a result of high driver demand; and the present method may not adjust the not to exceed threshold engine load in response to an active particulate filter regeneration that is requested in response to particulate filter soot load because the active particulate filter regeneration may be ceased when the particulate filter load has been reduced to a threshold level where particulate filter trapping efficiency exceeds a threshold level.

At 510, method 500 estimates an amount of soot that is stored in a particulate filter. Method 500 may determine the amount of soot that remains in the particulate filter via determining a pressure drop across the particulate filter as described at 504. Method 500 proceeds to 512.

Alternatively, or in addition, method 500 may estimate the efficiency of the gasoline particulate filter to trap soot. In one example, method 500 estimates the particulate filter soot trapping efficiency by indexing or referencing a table or function of empirically determined particulate filter efficiency values (e.g., FIG. 6). The table may be indexed or referenced by the amount of soot stored in the particulate filter. Further, in some examples, the table may be referenced by the distance that the vehicle has driven and the amount of hours that the engine has operated. The particulate filter efficiency may increase as engine operating hours increase and as the distance the vehicle has driven increases. The table outputs an estimate of particulate filter efficiency and method 500 proceeds to 512.

At 512, method 500 judges if engine operation is requested. Engine operation may include rotating the engine crankshaft and combusting fuel to generate torque via the engine. Engine operation may be requested in response to higher driver demand torque or power levels, low state of battery charge, and other vehicle operating conditions. If engine operation is requested, the answer is yes and method 500 proceeds to 514. Otherwise, the answer is no and method 400 proceeds to 540.

At 540, method 500 provides propulsive torque (e.g., torque to rotate the vehicle's wheels) solely via the electric machine (e.g., 240 of FIG. 2 or 306 of FIG. 3). If the vehicle driveline is the configuration shown in FIG. 2, then the driveline disconnect clutch 236 may be fully opened when propulsive torque is supplied solely via the electric machine 240. If the vehicle driveline is the configuration shown in FIG. 3, then propulsive torque is supplied solely via the electric machine 306. The amount of propulsive torque supplied by the electric machine may be a function of accelerator pedal position and vehicle speed. Method 500 proceeds to exit.

At 514, method 500 operates the engine. The engine may be operated via injecting fuel to the engine, combusting the fuel, and rotating the engine crankshaft. Method 500 proceeds to 516.

At 516, method 500 judges if the engine is to provide propulsive torque or power to the vehicle's wheels. In one example, method 500 may judge that engine propulsive torque or power is to be provided to the vehicle's wheels in response to a driver demand torque or power exceeding a threshold level. Method 500 may judge that engine propulsive torque or power is not to be provided to the vehicle's wheels when driver demand power or torque is less than a threshold. Engine propulsive torque may also be provided to the vehicle's wheels when battery state of charge is low or when electric machine degradation is present. If method 500 judges that engine propulsive torque is to be provided to vehicle wheels, the answer is yes and method 500 proceeds to 530. Otherwise, the answer is no and method 500 proceeds to 518.

At 530, method 500 optionally adjusts a mapping of accelerator pedal position to driveline or engine power or torque as a function of particulate filter soot loading or efficiency. In one example, driveline or engine power may be adjusted as a function of accelerator position as shown in FIG. 8. For example, if an amount of soot stored in a particulate filter is low such that particulate filter efficiency is lower, then a gradual increase in an engine power or torque request may be generated for small or medium accelerator pedal positions. However, at larger accelerator pedal positions, a larger change in engine power or torque may be generated. This is illustrated via curve 802 in FIG. 8. However, if an amount of soot stored in a particulate filter is higher such that particulate filter efficiency is higher, then a more substantial increase in an engine power or torque request may be generated for small or medium accelerator pedal positions. And, at larger accelerator pedal positions the increase in engine power or torque may result in a nearly same rate of increase as for smaller accelerator pedal input levels. This is illustrated via curve 804 in FIG. 8. Method 500 proceeds to exit.

In this way, engine power or torque output may be adjusted as a function of accelerator pedal position and the amount of soot stored in a particulate filter or particulate filter efficiency. This allows engine load to increase more gradually so that less soot may be generated. However, if the accelerator pedal input is large, the engine power or torque output may be increased up to the rated engine output power for the particular engine speed.

At 518, method 500 adjusts a maximum engine load threshold or limit (e.g., an engine load that is not to be exceeded) as a function of particulate filter soot load or particulate filter efficiency. In one example, the maximum engine load may be adjusted as shown in FIG. 7. In particular, the maximum engine load threshold may increase with the amount of soot that is stored in the particulate filter or particulate filter efficiency as indicated by curve 702. Further, the maximum engine load threshold may increase as engine temperature increases as indicted by curve 704. Method 500 proceeds to 520 after the engine load threshold is adjusted.

At 520, method 500 operates the engine up to the engine load limit threshold determined at 518. The engine may be operated to provide non-propulsive torque (e.g., torque that is not mechanically delivered to the vehicle's wheels). The engine load may be adjusted as a function of a desired charging torque or a desired amount of electrical charge to be produced via the generator (e.g., BISG 219 of FIG. 2 or generator 304 of FIG. 3). If the desired amount of electric charge would cause the engine load to exceed the threshold determined at 518, then engine load may be limited via limiting or constraining throttle position or camshaft timing. For example, if the engine load limit is 0.5 load at 2000 RPM, then the engine throttle opening amount may not exceed 25% of a full throttle opening amount so that the engine load threshold is not exceeded. In one example, the throttle opening amount may be adjusted according to a table or function that relates engine load to throttle position at a particular engine speed. Method 500 proceeds to exit after constraining the engine load to a level that is less than the engine load threshold.

In this way, engine load may be held to less than a threshold engine load when the engine is not providing propulsive torque to the vehicle's wheels. However, if the engine is delivering propulsive torque to the vehicle's wheels, then the engine load may not be constrained to less than the threshold engine load. Such operation may reduce engine particulate emissions when driver demand torque may be met via the electric machine and it allows the engine to provide a requested torque or power when the engine is providing a propulsive torque or power so that driver demand may be met.

Thus, the method of FIG. 5 provides for an engine operating method, comprising: adjusting a not to exceed threshold engine load via a controller in response to an amount of soot stored in a particulate filter of a spark ignited engine; and operating an engine without exceeding the not to exceed threshold engine load via the controller. The method includes where adjusting includes lowering the not to exceed threshold engine load in response to a reduction in the amount of soot stored in the particulate filter. The method includes where adjusting includes increasing the not to exceed threshold engine load in response to an increase in the amount of soot stored in the particulate filter. The method further comprises restricting an opening amount of a throttle to operate the engine without exceeding the not to exceed threshold engine load. The method further comprises restricting a fuel injection amount to operate the engine without exceeding the not to exceed threshold engine load. The method further comprises regenerating the particulate filter and reducing the not to exceed threshold engine load in response to the amount of soot stored in the particulate filter immediately following the regeneration. The method includes where operating the engine without exceeding the not to exceed threshold engine load includes supplying engine output power to an electric machine.

The method of FIG. 5 also provides for an engine operating method, comprising: adjusting a not to exceed threshold engine load via a controller in response to an amount of soot stored in a particulate filter of a spark ignited engine; operating an engine without exceeding the not to exceed threshold engine load via the controller while not providing propulsive torque to vehicle wheels; and operating the engine and exceeding the not to exceed threshold engine load via the controller while providing propulsive torque to vehicle wheels. The method further comprises regenerating the particulate filter in response to an amount of soot stored in the particulate filter exceeding a threshold level. The method further comprises adjusting the not to exceed threshold engine load in response to an estimate of an amount of soot stored in the particulate filter immediately following the regeneration. The method further comprises supplying torque from the engine to an electric machine while not providing propulsive torque to vehicle wheels. The method includes where the engine is operated while not providing propulsive torque to vehicle wheels in response to a driver demand power being less than a threshold power. The method includes where the engine is operated while providing propulsive torque to vehicle wheels in response to the driver demand power being greater than the threshold power. The method further comprises providing propulsive power to the vehicle wheels solely via an electric machine when operating the engine without exceeding the not to exceed threshold engine load.

In another representation, the method also provides for an engine operating method, comprising: adjusting engine output torque or power as a function of accelerator pedal position and an amount of soot stored in a particulate filter. The method may further comprise adjusting the engine output power as a function of engine temperature. The method may include increasing the engine output power at a first rate for amounts of soot stored in a particulate filter being less than a first amount. The method may include increasing the engine output power at a second rate for amounts of soot stored in the particulate filter being greater than the first amount, the second rate greater than the first rate.

Referring now to FIG. 6, a plot of an example relationship (e.g., function) between an amount of soot trapped in a particulate filter and soot trapping efficiency of the particulate filter is shown. Curve 602 shows that soot trapping efficiency of the particulate filter increases as the amount of soot trapped in the particulate filter increases. Therefore, the particulate filter may trap more soot so that engine tailpipe emissions may still be low even if an engine is operated at lower temperatures and higher engine loads. This may improve the ability of the engine to meet performance and emissions objectives. Particulate filter soot trapping efficiency may be estimated via referencing a table or function via an amount of soot trapped in the filter and the table or function outputs the estimate of particulate filter soot trapping efficiency.

Referring now to FIG. 7, a plot of an example relationship (e.g., function) between particulate filter soot load (e.g., an amount of soot stored in a particulate filter), a maximum engine load threshold, and engine temperature is shown. The vertical axis represents the maximum engine load threshold and the maximum engine load threshold increases in the direction of the vertical axis arrow. The horizontal axis represents the amount of soot that is stored in the particulate filter and the amount of soot stored in the particulate filter increases in the direction of the horizontal axis. The third axis represents engine temperature and engine temperature increases in the direction of the third axis arrow. A table or function in controller memory may describe the relationship shown in FIG. 7, and values in the table or function may be empirically determined via operating an engine on a dynamometer and determining what engine load values maintain particulate flow out of the particulate filter below a threshold value as engine temperature and particulate filter soot load vary.

Curve 702 shows that maximum engine load may be increased as the amount of soot stored in the particulate filter increases. This allows the engine output to increase while tailpipe emissions may still be low. Curve 704 shows that the maximum engine load may also increase as engine temperature increases. This allows the engine load to be increased at higher engine temperature where an increase in particulate emissions resulting from operating the engine at higher loads may be compensated or offset by the engine operating at a higher temperature where engine soot production may be reduced. Mesh 700 shows the interrelationships between these vehicle operating conditions and how the maximum engine load may be adjusted to reduce particulate emissions.

Maximum engine load may be estimated via referencing a table or function via an amount of soot trapped in the filter and engine temperature. The table or function outputs the maximum engine load.

Referring now to FIG. 8, a plot of an example relationship (e.g., function) between accelerator pedal position, particulate filter soot load (e.g., an amount of soot stored in a particulate filter), an engine power request amount. The vertical axis represents the accelerator pedal position and accelerator pedal position increases in the direction of the vertical axis arrow. The horizontal axis represents an engine power request and the engine power request increases in the direction of the horizontal axis arrow. The third axis represents particulate filter soot load and the particulate filter soot load increases in the direction of the third axis arrow. The engine power request may be determined via referencing a table or function in controller memory via accelerator pedal position and particulate filter soot load. The table or function outputs the engine power request.

Curve 802 shows that the engine power request increases as the accelerator pedal position increases. However, the engine power increases at a first rate for small accelerator pedal input and at a second rate for larger accelerator pedal inputs, the second rate greater than the first rate. Consequently, the engine power request increases by a small amount at smaller accelerator pedal inputs and then increases by larger amounts for larger accelerator pedal inputs. This relationship provides for larger accelerator pedal inputs before significantly increasing the engine power request so that the engine may output lower amounts of soot for larger accelerator pedal inputs. This may reduce engine soot output for drivers that nervously apply the accelerator pedal.

Curve 804 shows that the engine power request increases linearly with accelerator pedal position for higher particulate filter soot loads. This may allow a driver to feel a more responsive accelerator pedal feel while maintaining tailpipe soot levels since the particulate filter may operate with a higher efficiency at higher particulate filter soot loads. Mesh 800 shows that for particulate filter soot loads between curves 802 and 804, the engine power request may be blended to provide a smooth progression in requested engine power as a function of accelerator pedal position and particulate filter soot load.

In this way, the engine power request may be adjusted as a function of particulate filter soot load and accelerator pedal position to reduce engine soot output for lower accelerator pedal positions when the particulate filter soot load is low. However, all available engine power may be available for large accelerator pedal inputs and different particulate filter soot loads so that urgent engine power may be provided when desired.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. An engine operating method, comprising:
adjusting a not to exceed threshold engine load via a controller in response to an efficiency estimate of a particulate filter of a spark ignited engine; and
operating an engine without exceeding the not to exceed threshold engine load via the controller.

2. The method of claim 1, where adjusting includes lowering the not to exceed threshold engine load in response to a reduction in the amount of soot stored in the particulate filter, and where the efficiency estimate of the particulate filter increases as an amount of soot stored in the particulate filter increases.

3. The method of claim 1, where adjusting includes increasing the not to exceed threshold engine load in response to an increase in the amount of soot stored in the particulate filter.

4. The method of claim 1, further comprising restricting an opening amount of a throttle to operate the engine without exceeding the not to exceed threshold engine load.

5. The method of claim 1, further comprising restricting a fuel injection amount to operate the engine without exceeding the not to exceed threshold engine load.

6. The method of claim 1, further comprising regenerating the particulate filter and reducing the not to exceed threshold engine load in response to the amount of soot stored in the particulate filter immediately following the regeneration.

7. The method of claim 1, where operating the engine without exceeding the not to exceed threshold engine load includes supplying engine output power to an electric machine, and adjusting an accelerator pedal position to engine power relationship as a function of particulate filter soot load.

8. An engine operating method, comprising:
adjusting a not to exceed threshold engine load via a controller in response to an efficiency estimate of a particulate filter of a spark ignited engine, where the efficiency estimate increases as an amount of soot stored in the particulate filter increase;
operating an engine without exceeding the not to exceed threshold engine load via the controller while not providing propulsive torque to vehicle wheels; and
operating the engine and exceeding the not to exceed threshold engine load via the controller while providing propulsive torque to vehicle wheels.

9. The method of claim 8, further comprising regenerating the particulate filter in response to an amount of soot stored in the particulate filter exceeding a threshold level, and further comprising adjusting the not to exceed threshold engine load as a function of engine temperature.

10. The method of claim 9, further comprising adjusting the not to exceed threshold engine load in response to an estimate of an amount of soot stored in the particulate filter immediately following the regeneration.

11. The method of claim 8, further comprising supplying torque from the engine to an electric machine while not providing propulsive torque to vehicle wheels.

12. The method of claim 8, where the engine is operated while not providing propulsive torque to vehicle wheels in response to a driver demand power being less than a threshold power.

13. The method of claim 12, where the engine is operated while providing propulsive torque to vehicle wheels in response to the driver demand power being greater than the threshold power.

14. The method of claim 8, further comprising providing propulsive power to the vehicle wheels solely via an electric machine when operating the engine without exceeding the not to exceed threshold engine load.

15. A system, comprising:
a spark ignition engine;
a particulate filter in an exhaust system of the spark ignition engine; and
a controller including executable instructions stored in non-transitory memory to maintain engine load less than a threshold engine load in response to an amount of soot stored in a particulate filter and a driver demand power, and instructions stored in the non-transitory memory to adjust an accelerator pedal position to engine power relationship as a function of particulate filter soot load.

16. The system of claim 15, additional instructions to increase engine load above the threshold engine load in response to the driver demand power increasing.

17. The system of claim 15, further comprising an electric machine and additional instructions to supply power from the spark ignition engine to the electric machine when maintaining engine load less than the threshold engine load.

18. The system of claim 15, further comprising additional instructions to adjust the threshold engine load in response to the amount of soot stored in the particulate filter.

19. The system of claim 15, where the driver demand power is a function of accelerator pedal position.

20. The system of claim 15, further comprising additional instructions to estimate the amount of soot stored in the particulate filter.

* * * * *